United States Patent
Cobb

(10) Patent No.: US 9,104,918 B2
(45) Date of Patent: Aug. 11, 2015

(54) METHOD AND SYSTEM FOR DETECTING SEA-SURFACE OIL

(71) Applicant: Behavioral Recognition Systems, Inc., Houston, TX (US)

(72) Inventor: Wesley Kenneth Cobb, The Woodlands, TX (US)

(73) Assignee: BEHAVIORAL RECOGNITION SYSTEMS, INC., Houston, TX (US)

( * ) Notice: Subject to any disclaimer, the term of this patent is extended or adjusted under 35 U.S.C. 154(b) by 59 days.

(21) Appl. No.: 13/971,027

(22) Filed: Aug. 20, 2013

(65) Prior Publication Data

US 2014/0050355 A1 Feb. 20, 2014

Related U.S. Application Data

(60) Provisional application No. 61/691,102, filed on Aug. 20, 2012.

(51) Int. Cl.
*G06K 9/00* (2006.01)

(52) U.S. Cl.
CPC ........ *G06K 9/00771* (2013.01); *G06K 9/00664* (2013.01)

(58) Field of Classification Search
None
See application file for complete search history.

(56) References Cited

U.S. PATENT DOCUMENTS

| | | | |
|---|---|---|---|
| 4,679,077 A | 7/1987 | Yuasa et al. | |
| 5,113,507 A | 5/1992 | Jaeckel | |
| 5,748,775 A | 5/1998 | Tsuchikawa et al. | |
| 5,751,378 A | 5/1998 | Chen et al. | |
| 5,969,755 A | 10/1999 | Courtney | |
| 6,252,974 B1 | 6/2001 | Martens et al. | |
| 6,263,088 B1 | 7/2001 | Crabtree et al. | |
| 6,570,608 B1 | 5/2003 | Tserng | |
| 6,661,918 B1 | 12/2003 | Gordon et al. | |
| 6,674,877 B1 | 1/2004 | Jojic et al. | |
| 6,678,413 B1 | 1/2004 | Liang et al. | |
| 6,856,249 B2 | 2/2005 | Strubbe et al. | |
| 6,940,998 B2 | 9/2005 | Garoutte | |

(Continued)

FOREIGN PATENT DOCUMENTS

| | | |
|---|---|---|
| WO | 2006046021 A1 | 5/2006 |
| WO | 2009049314 A2 | 4/2009 |

OTHER PUBLICATIONS

J: Connell et al., "Detection and Tracking in the IBM PeopleVision System," IEEE ICME, Jun. 2004: pp. 1-4, <http://www.research.ibm.com/peoplevision>.

(Continued)

*Primary Examiner* — Tahmina Ansari
(74) *Attorney, Agent, or Firm* — Patterson & Sheridan LLP

(57) ABSTRACT

A behavioral recognition system may include both a computer vision engine and a machine learning engine configured to observe and learn patterns of behavior in video data. Certain embodiments may be configured to detect and evaluate the presence of sea-surface oil on the water surrounding an offshore oil platform. The computer vision engine may be configured to segment image data into detected patches or blobs of surface oil (foreground) present in the field of view of an infrared camera (or cameras). A machine learning engine may evaluate the detected patches of surface oil to learn to distinguish between sea-surface oil incident to the operation of an offshore platform and the appearance of surface oil that should be investigated by platform personnel.

27 Claims, 6 Drawing Sheets

(56) References Cited

U.S. PATENT DOCUMENTS

| | | | |
|---|---|---|---|
| 7,076,102 | B2 | 7/2006 | Lin et al. |
| 7,136,525 | B1 | 11/2006 | Toyama et al. |
| 7,158,680 | B2 | 1/2007 | Pace |
| 7,200,266 | B2 | 4/2007 | Ozer et al. |
| 7,227,893 | B1 | 6/2007 | Srinivasa et al. |
| 7,436,887 | B2 | 10/2008 | Yeredor et al. |
| 7,825,954 | B2 | 11/2010 | Zhang et al. |
| 7,868,912 | B2 | 1/2011 | Venetianer et al. |
| 8,124,931 | B2 * | 2/2012 | Andrews et al. ............. 250/301 |
| 2003/0107650 | A1 | 6/2003 | Colmenarez et al. |
| 2003/0228058 | A1 | 12/2003 | Xie et al. |
| 2004/0151342 | A1 * | 8/2004 | Venetianer et al. ........... 382/103 |
| 2005/0001759 | A1 | 1/2005 | Khosla |
| 2005/0025361 | A1 | 2/2005 | Gadre et al. |
| 2005/0105765 | A1 | 5/2005 | Han et al. |
| 2005/0240629 | A1 | 10/2005 | Gu et al. |
| 2006/0018516 | A1 | 1/2006 | Masoud et al. |
| 2006/0138338 | A1 | 6/2006 | Tezuka et al. |
| 2006/0165386 | A1 | 7/2006 | Garoutte |
| 2006/0190419 | A1 | 8/2006 | Bunn et al. |
| 2006/0193516 | A1 | 8/2006 | Toyama et al. |
| 2006/0222206 | A1 | 10/2006 | Garoutte |
| 2007/0250898 | A1 | 10/2007 | Scanlon et al. |
| 2008/0002856 | A1 | 1/2008 | Ma et al. |
| 2008/0181453 | A1 | 7/2008 | Xu et al. |
| 2008/0181499 | A1 | 7/2008 | Yang et al. |
| 2008/0193010 | A1 | 8/2008 | Eaton et al. |
| 2008/0240496 | A1 | 10/2008 | Senior |
| 2008/0247599 | A1 | 10/2008 | Porikli et al. |
| 2008/0252723 | A1 | 10/2008 | Park |
| 2009/0022364 | A1 | 1/2009 | Swaminathan et al. |
| 2009/0067716 | A1 | 3/2009 | Brown et al. |
| 2009/0210367 | A1 | 8/2009 | Armstrong et al. |
| 2009/0297023 | A1 | 12/2009 | Lipton et al. |
| 2009/0324107 | A1 | 12/2009 | Walch |
| 2010/0063949 | A1 | 3/2010 | Eaton et al. |
| 2010/0150471 | A1 | 6/2010 | Cobb et al. |
| 2010/0322516 | A1 | 12/2010 | Xu et al. |
| 2011/0044536 | A1 * | 2/2011 | Cobb et al. .................... 382/165 |
| 2011/0280442 | A1 | 11/2011 | Chen et al. |
| 2013/0016220 | A1 * | 1/2013 | Brown .......................... 348/164 |
| 2014/0050355 | A1 * | 2/2014 | Cobb ............................ 382/103 |

OTHER PUBLICATIONS

Helmut Grabner et al., "On-line Boosting and Vision," IEEE Conference on Computer Vision and Pattern Recognition (CVPR), 2006, vol. 1: pp. 260-267.

Ismail Haritaoglu et al., "Ghost: A Human Body Part Labeling System Using Silhouettes," 14th Annual International Conference on Pattern Recognition, Aug. 1998: pp. 77-82.

Richard Nock et al., "Statistical Region Merging," IEEE Transactions on Pattern Analysis and Machine Intelligence, Nov. 2004, vol. 26(11): pp. 1452-1458.

Apewokin et al. "Multimodal Mean Adaptive Backgrounding for Embedded Real-Time Video Surveillance," Jun. 2007, IEEE 6 pages. Minneapolis, MN US.

Elgammal et al. "Non-parametric Model for Background Substraction," Computer Vision Laboratory, University of Maryland; Jun. 2000; 17 pages, College Park, MD US.

Haritaogul et al. "W4: Real-Time Surveillance of People and Their Activities," IEEE Transactions on Pattern Analysis and Machine Intelligence, Aug. 2000; vol. 22, No. 8; pp. 809-830.

Ivanov et al. "Video Surveillance of Interactions," MIT Media Laboratory, Cambridge, MA, Jul. 1999; 8 pages, Fort Collins, CO US.

Chris Stauffer et al., "Adaptive background mixture models for real-time tracking," Proceedings IEEE Conference on Computer Vision and Pattern Recognition, 1999: pp. 246-252.

Pentti Kanerva "Sparse Distributed memory and Related Models," M.H. Hassoun, ed., Associative Neural Memories: Theory and Implementation, 1993, pp. 50-76. New York: Oxford University Press.

Senior et al. "Appearance Models for Occlusion Handling," IBM T.J. Watson Research Center, 2001, 8 pages, Yorktown, Heights, NY US.

Chris Stauffer et al., "Learning Patterns of Activity Using Real-Time Tracking," IEEE Transactions on Pattern Analysis and Machine Intelligence (TPAMI), Aug. 2000, vol. 22(8): 747-757.

International Search Report for PCT/US2013/055755 dated Dec. 20, 2013.

\* cited by examiner

METHOD AND SYSTEM FOR DETECTING SEA-SURFACE OIL

CROSS-REFERENCE TO RELATED APPLICATIONS

This application claims priority to U.S. provisional application having Ser. No. 61/691,102, filed on Aug. 20, 2012, which is hereby incorporated by reference in its entirety.

BACKGROUND OF THE INVENTION

1. Field of the Invention

Embodiments of the invention provide techniques for analyzing a sequence of video frames. More particularly, embodiments of the invention provide a combination of a camera system and a computer vision engine and machine learning system configured to detect and evaluate the presence of sea-surface oil, e.g., surrounding an offshore drilling platform.

2. Description of the Related Art

Some currently available video surveillance systems provide simple object recognition capabilities. For example, a video surveillance system may be configured to classify a group of pixels (referred to as a "blob") in a given frame as being a particular object (e.g., a person or vehicle). Once identified, a "blob" may be tracked from frame-to-frame in order to follow the "blob" moving through the scene over time, e.g., a person walking across the field of vision of a video surveillance camera. Further, such systems may be configured to determine when an object has engaged in certain predefined behaviors. For example, the system may include definitions used to recognize the occurrence of a number of pre-defined events, e.g., the system may evaluate the appearance of an object classified as depicting a car (a vehicle-appear event) coming to a stop over a number of frames (a vehicle-stop event). Thereafter, a new foreground object may appear and be classified as a person (a person-appear event) and the person then walks out of frame (a person-disappear event). Further, the system may be able to recognize the combination of the first two events as a "parking-event."

However, such surveillance systems typically are unable to identify or update objects, events, behaviors, or patterns (or classify such objects, events, behaviors, etc., as being normal or anomalous) by observing what happens in the scene over time; instead, such systems rely on static patterns defined in advance. Thus, in practice, these systems rely on predefined definitions for objects and/or behaviors to evaluate a video sequence. Unless the underlying system includes a description for a particular object or behavior, the system is generally incapable of recognizing that behavior (or at least instances of the pattern describing the particular object or behavior). More generally, such systems are often unable to identify objects, events, behaviors, or patterns (or classify such objects, events, behaviors, etc., as being normal or anomalous) by observing what happens in the scene over time; instead, such systems rely on static patterns defined in advance.

No currently available video surveillance system is capable of reliably identifying sea-surface oil, which can result from operations incident to the normal operation of an offshore oil platform or oil spills, leaks, etc. Although the optical properties of oil-films in the visible, UV, and IR spectral regions have been studied extensively, a system designed to identify sea-surface oil must address constant variations in the maritime environment, including changes in illumination angle, transparency, aerosols, haze, cloud cover, and transitions between night and day. Such variations can produce false-positive and otherwise erroneous identifications of sea-surface oil.

SUMMARY OF THE INVENTION

One embodiment of the invention includes a method for analyzing a scene depicted in an input stream of video frames captured by one or more cameras. This method may include, for one or more of the video frames, identifying one or more foreground blobs in the video frame. Each foreground blob may correspond to one or more contiguous pixels of the video frame determined to depict sea-surface oil. This method may further include evaluating the one or more foreground blobs to derive expected patterns of observations of sea-surface oil within a field-of-view of the cameras. The input stream of video frames may be generated by one or more long wavelength infrared (LWIR) cameras.

In a particular embodiment, this method may further include, after deriving the expected patterns of occurrences of sea-surface oil, receiving a set of foreground blobs identified in a subsequent one of the video frames and, upon determining that at least a first one of the foreground blobs does not correspond to at least one of the expected patterns of occurrences of sea-surface oil, generating an alert message.

Another embodiment includes a method of analyzing a scene depicted in an input stream of video frames. This method includes, for one or more of the video frames, identifying one or more foreground blobs in the video frame. Each foreground blob generally corresponds to contiguous pixels of the video frame determined by a behavior recognition system to depict a patch of sea-surface oil. Further, the behavior recognition system is configured to learn to distinguish between foreground objects depicting patches of sea-surface oil and false positive detections of patches of sea-surface oil resulting from noise occurring in the one or more video frames. Upon determining one of the foreground blobs depicts a patch of sea-surface oil deviates from expected patterns of sea-surface oil derived by the behavior recognition system, an alert message is generated. Examples of noise include that result in false-positive foreground blobs may include lighting, absorption, and extinction artifacts in the video frames.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
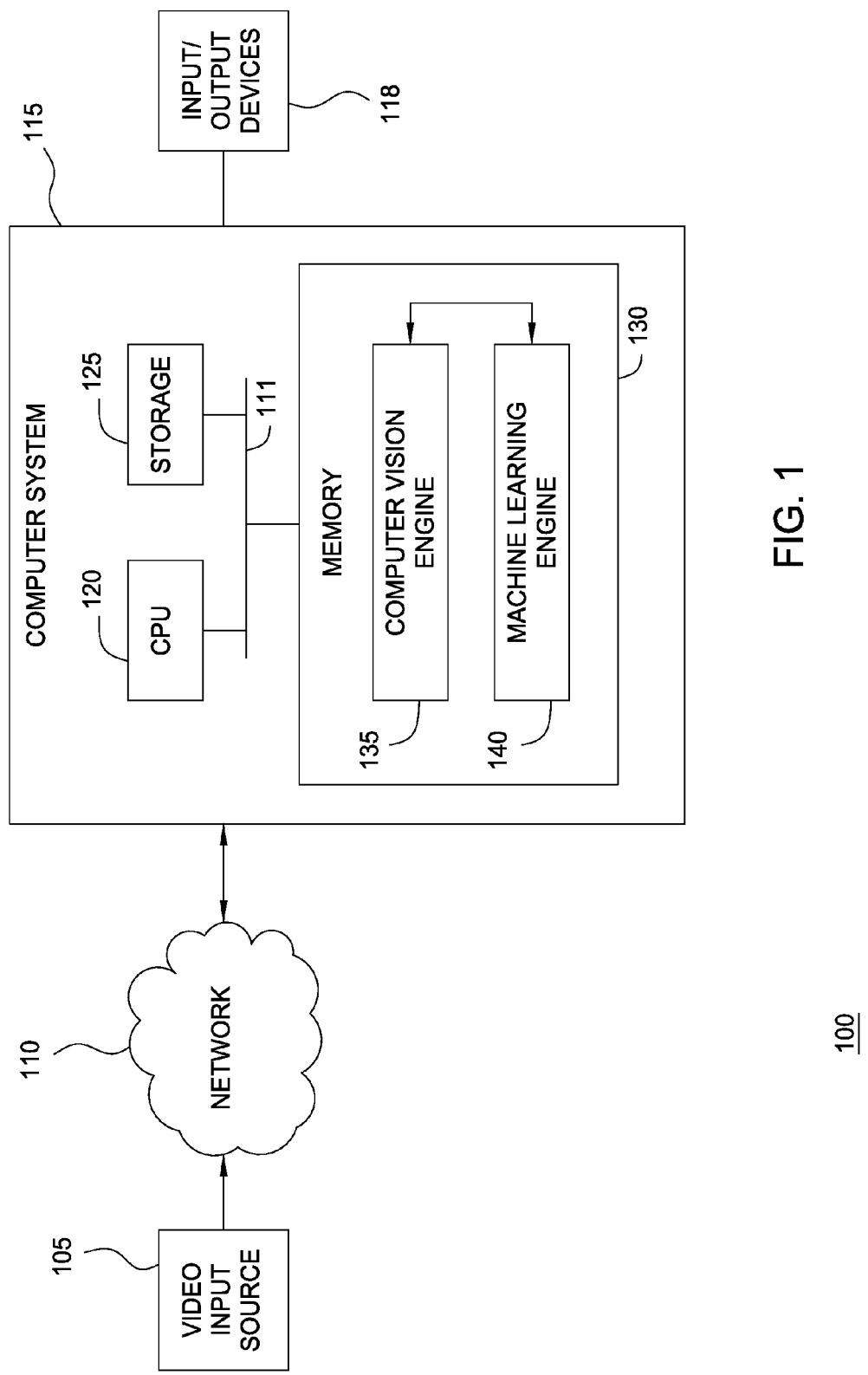
FIG. 1 illustrates components of a video analysis system, according to one embodiment of the invention.

Embodiments of the present invention provide a method and a system for analyzing and learning to identify unusual dispersions of oil floating on a liquid surface. A computer vision engine may be configured to process video frames from multiple cameras observing a common region of sea surface. The computer vision engine may evaluate frames of video to determine what pixels depict seawater (background) and what pixels depict oil floating on the sea surface (foreground). Contiguous regions of pixels classified as foreground are passed to a machine learning engine, which observes a variety of features of the foreground blobs to learn expected patterns in the scene and issue an alert when unexpected, anomalous oil patches are observed.

In one embodiment, a multiplexor module is configured to receive video streams (also referred to herein as "signals") from three or more long-wavelength infrared (LWIR) cameras whose output is filtered by distinct band-pass filters and multiplex the signals to generate a single synthetic signal whose brightness indicates a match with an IR signature of sea-surface oil. A computer vision engine determines, from the synthetic signal, foreground blobs representing patches of contiguous pixels having values indicating a match to the IR signature of oil, and further extracts features such as position, size, change in size, etc. which are pertinent to sea-surface oil. In turn, a machine learning engine is configured to build models of certain behaviors within the scene based on the foreground blobs and extracted features, and determine whether observations indicate that the behavior of an object is anomalous or not, relative to the model. In one embodiment, e.g., the machine learning engine may model observed sea-surface oil over time, and determine whether any given foreground blob corresponding to sea-surface oil is unusual or anomalous relative to prior sea-surface oil which has been observed. The machine learning engine may issue an alert when anomalous sea-surface oil is observed so that the oil may be investigated.

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other examples media include communications media through which information is conveyed to a computer, such as through a computer or telephone network, including wireless communications networks.

In general, the routines executed to implement the embodiments of the invention may be part of an operating system or a specific application, component, program, module, object, or sequence of instructions. The computer program of the present invention is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates components of a video analysis and behavior-recognition system 100, according to one embodiment. As shown, the behavior-recognition system 100 includes a video input source 105, a network 110, a computer system 115, and input and output devices 118 (e.g., a monitor, a keyboard, a mouse, a printer, and the like). The network 110 may transmit video data recorded by the video input 105 to the computer system 115. Illustratively, the computer system 115 includes a CPU 120, storage 125 (e.g., a disk drive, optical disk drive, floppy disk drive, and the like), and a memory 130 which includes both a computer vision engine 135 and a machine-learning engine 140. As described in greater detail below, the computer vision engine 135 and the machine-learning engine 140 may provide software applications configured to analyze a sequence of video frames provided by the video input 105.

Network 110 receives video data (e.g., video stream(s), video images, or the like) from the video input source 105. The video input source 105 may be a video camera, a VCR, DVR, DVD, computer, web-cam device, or the like. For example, the video input source 105 may be a stationary video camera aimed at a certain area (e.g., a subway station, a parking lot, a building entry/exit, etc.), which records the events taking place therein. Generally, the area visible to the camera is referred to as the "scene." The video input source 105 may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value) or grayscale value (e.g., a radiance value between 0-255). Further, the video stream may be formatted using known formats including MPEG2, MJPEG, MPEG4, H.263, H.264, and the like.

In one embodiment, video input source 105 may capture infrared spectrum instead of visible light. Further, multiple cameras could be band-pass filtered to capture different wavelength bands within the infrared spectrum. In such a case, images from each camera could be registered to one another, allowing a composite image to be generated from the multiple cameras. As described in greater detail below, by using multiple observations of the sea surface in different wavelength bands of the infrared spectrum, the contrast between oil on seawater may be enhanced, making it more readily detectable to the background foreground module. In one embodiment, the computer vision engine may filter clutter from video input source, reducing input images to largely black (background) regions representing seawater and white (foreground) regions representing oil in the field of view to the cameras. In turn, the machine learning engine learns to filter noise from the observations of sea-surface oil, and generates alerts after observing an unusual appearance (or behavior) of sea-surface oil. Examples of noise include that result in false-positive foreground blobs (i.e., false positive detections of patches of sea-surface oil) include lighting, absorption, and extinction artifacts in the video frames.

In one embodiment, the computer vision engine 135 is configured to receive input from a multiplexor module which multiplexes multiple data channels. Alternatively, the computer vision engine 135 may itself include the multiplexor module. In one embodiment, the multiplexor module may process data from three (or more) channels, co-adding image data and performing operations on the video streams. Each channel may correspond to a camera capturing a different portion of the infrared spectrum. The cameras may be positioned collinear to one another. That is, the cameras may each share a substantially identical field of view. Further, the image from each camera may be registered to one another. As noted, however, each camera may cover a different band of the infrared spectrum. That is, each camera subsamples a different band of the infrared spectrum. In one embodiment, each camera is a long wavelength infrared (LWIR) camera with configurable filters. The multiplexor module may take the video signals from the video sources, combine them, as further described herein, and pass the information to the computer vision engine 135.

As noted above, the computer vision engine 135 may be configured to analyze image data (whether in the visible or IR spectrum (or otherwise)) to identify objects in the video stream, identify a variety of appearance and kinematic features used by a machine learning engine 140 to derive object classifications, derive a variety of metadata regarding the actions and interactions of such objects, and supply this information to the machine-learning engine 140. And in turn, the machine-learning engine 140 may be configured to evaluate, observe, learn and remember details regarding events (and types of events) that transpire within the scene over time.

In one embodiment, the machine-learning engine 140 receives the video frames and the data generated by the computer vision engine 135. The machine-learning engine 140 may be configured to analyze the received data, cluster objects having similar visual and/or kinematic features, build semantic representations of events depicted in the video frames. Over time, the machine learning engine 140 learns expected patterns of behavior for objects that map to a given cluster. Thus, over time, the machine learning engine learns from these observed patterns to identify normal and/or abnormal events. That is, rather than having patterns, objects, object types, or activities defined in advance, the machine learning engine 140 builds its own model of what different object types have been observed (e.g., based on clusters of kinematic and or appearance features) as well as a model of expected behavior for a given object type. Thereafter, the machine learning engine can decide whether the behavior of an observed event is anomalous or not based on prior learning.

Data describing whether anomalous sea-surface oil has been determined and/or describing the anomalous sea-surface oil may be provided to output devices 118 to issue alerts (e.g., an alert message presented on a GUI interface screen).

In general, the computer vision engine 135 and the machine-learning engine 140 both process video data in real-time. However, time scales for processing information by the computer vision engine 135 and the machine-learning engine 140 may differ. For example, in one embodiment, the computer vision engine 135 processes the received video data frame-by-frame, while the machine-learning engine 140 processes data every N-frames. In other words, while the computer vision engine 135 may analyze each frame in real-time to derive a set of appearance and kinematic data related to objects observed in the frame, the machine-learning engine 140 is not constrained by the real-time frame rate of the video input.

Note, however, FIG. 1 illustrates merely one possible arrangement of the behavior-recognition system 100. For example, although the video input source 105 is shown connected to the computer system 115 via the network 110, the network 110 is not always present or needed (e.g., the video input source 105 may be directly connected to the computer system 115). Further, various components and modules of the behavior-recognition system 100 may be implemented in other systems. For example, in one embodiment, the computer vision engine 135 may be implemented as a part of a video input device (e.g., as a firmware component wired directly into a video camera). In such a case, the output of the video camera may be provided to the machine-learning engine 140 for analysis. Similarly, the output from the computer vision engine 135 and machine-learning engine 140 may be supplied over computer network 110 to other computer systems. For example, the computer vision engine 135 and machine-learning engine 140 may be installed on a server system and configured to process video from multiple input sources (i.e., from multiple cameras). In such a case, a client application 250 running on another computer system may request (or receive) the results of over network 110.

Figure 2:
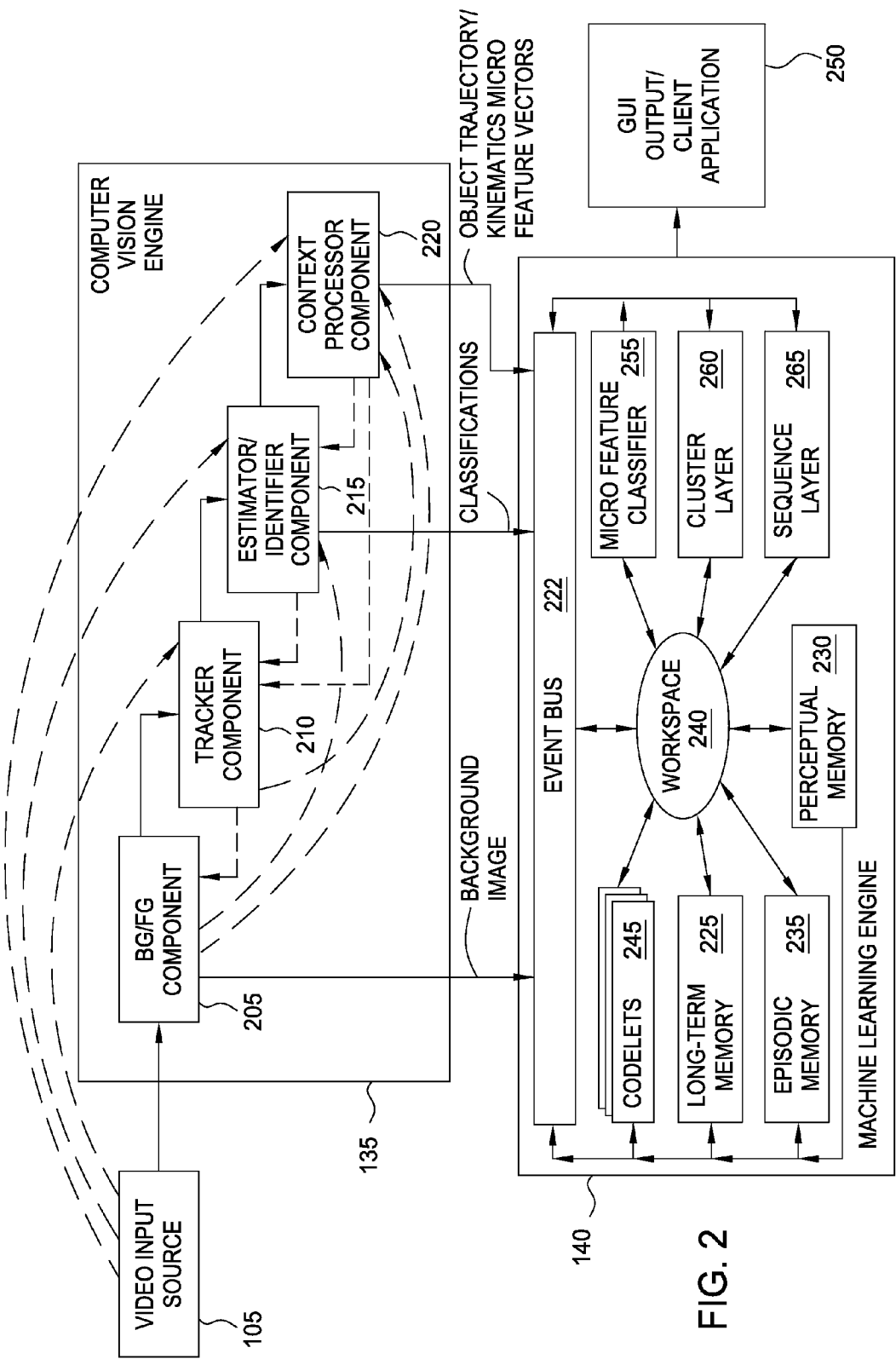
FIG. 2 further illustrates components of the video analysis system shown in FIG. 1, according to one embodiment of the invention.

FIG. 2 further illustrates components of the computer vision engine 135 and the machine-learning engine 140 first illustrated in FIG. 1, according to one embodiment of the invention. As shown, the computer vision engine 135 includes a background/foreground (BG/FG) component 205, a tracker component 210, an estimator/identifier component 215, and a context processor component 220. Collectively, the components 205, 210, 215, and 220 provide a pipeline for processing an incoming sequence of video frames supplied by the video input source 105 (indicated by the solid arrows linking the components). Additionally, the output of one component may be provided to multiple stages of the component pipeline (as indicated by the dashed arrows) as well as to the machine-learning engine 140. In one embodiment, the components 205, 210, 215, and 220 may each provide a software module configured to provide the functions described herein. Of course one of ordinary skill in the art will recognize that the components 205, 210, 215, and 220 may be combined (or further subdivided) to suit the needs of a particular case and further that additional components may be added (or some may be removed) from a video surveillance system.

In one embodiment, the BG/FG component 205 may be configured to separate each frame of video provided by the video input source 105 into a static part (the scene background) and a collection of volatile parts (the scene foreground). The frame itself may include a two-dimensional array of pixel values for multiple channels (e.g., RGB channels for color video or grayscale channel or radiance channel for black and white video). In one embodiment, the BG/FG component 205 may model background states for each pixel using an adaptive resonance theory (ART) network. That is, each pixel may be classified as depicting scene foreground or scene background using an ART network modeling a given pixel. Of course, other approaches to distinguish between scene foreground and background may be used. Again, in context of this discussion, the background may generally corresponds to pixels depicting seawater, whereas foreground may generally correspond to pixels depicting sea-surface oil.

Additionally, the BG/FG component 205 may be configured to generate a mask used to identify which pixels of the scene are classified as depicting foreground and, conversely, which pixels are classified as depicting scene background. The BG/FG component 205 then identifies regions of the scene that contain a portion of scene foreground (referred to as a foreground "blob" or "patch") and supplies this information to subsequent stages of the pipeline. Additionally, pixels classified as depicting scene background may be used to generate a background image modeling the scene.

In context of detecting and evaluating sea-surface oil, the BG/FG component classifies pixels depicting surface oil as foreground. Thus, the computer vision engine is being used as a "blob" detector/tracker, where blobs of pixels classified as foreground correspond to patches of sea-surface oil. In such a case, blobs do not need to address occlusion or depth ordering. Instead, blobs that intersect may be merged.

The tracker component 210 may receive the foreground patches produced by the BG/FG component 205 and generate computational models for the patches. The tracker component 210 may be configured to use this information, and each successive frame of raw-video, to attempt to track the motion of an object depicted by a given foreground patch as it moves about the scene. That is, the tracker component 210 provides continuity to other elements of the system by tracking a given object from frame-to-frame.

The estimator/identifier component 215 may receive the output of the tracker component 210 (and the BF/FG component 205) and identify a variety of kinematic and/or appearance features of a foreground object, e.g., size, height, width, and area (in pixels), reflectivity, shininess rigidity, speed velocity, etc.

In context of detecting sea-surface oil, the features of a foreground object (a blob of pixels) may include the location and sizes of a foreground blob. Note, the computer vision engine could correct for distance and the solid angle effects distorting the size of a foreground object detected at different areas within the field of view of a camera. Other features of a foreground blob may include rates of change in blob size and/or a measure of intensity (i.e., how bright the blob is), motion characteristics of the foreground blobs, whether the foreground blobs have non-sharp edges, whether the foreground blobs have high fractal dimension, and whether the foreground blobs are asymmetrical.

The context processor component 220 may receive the output from other stages of the pipeline (i.e., the tracked objects, the background and foreground models, and the results of the estimator/identifier component 215). Using this information, the context processor 220 may be configured to generate a stream of context events regarding objects tracked (by tracker component 210) and evaluated (by estimator identifier component 215). For example, the context processor component 220 may package a stream of micro-feature vectors and kinematic observations of an object and output this to the machine-learning engine 140, e.g., at a rate of 5 Hz. In one embodiment, the context events are packaged as a trajectory. As used herein, a trajectory generally refers to a vector packaging the kinematic data of a particular foreground object in successive frames or samples. Each element in the trajectory represents the kinematic data captured for that object at a particular point in time. Typically, a complete trajectory includes the kinematic data obtained when an object is first observed in a frame of video along with each successive observation of that object up to when it leaves the scene (or becomes stationary to the point of dissolving into the frame background). Accordingly, assuming computer vision engine 135 is operating at a rate of 5 Hz, a trajectory for an object is updated every 200 milliseconds, until complete.

The computer vision engine 135 may take the output from the components 205, 210, 215, and 220 describing the motions and actions of the tracked objects in the scene and supply this information to the machine-learning engine 140. In context of detecting sea-surface oil, the context event package may include a list of foreground blobs (patches of surface oil) detected by the computer vision engine 135, the size and position of each blob, and a trajectory of a blob observed over time. The context event package passed to the machine learning engine 140 could also include any other features of a foreground object detected or generated by components of the computer vision engine 136, as well as the raw data received from the video feeds.

Illustratively, the machine-learning engine 140 includes a long-term memory 225, a perceptual memory 230, an episodic memory 235, a workspace 240, codelets 245, a micro-feature classifier 255, a cluster layer 260 and a sequence layer 265. Additionally, the machine-learning engine 140 includes a client application 250, allowing the user to interact with the video surveillance system 100 using a graphical user interface. Further still, the machine-learning engine 140 includes an event bus 222. In one embodiment, the components of the computer vision engine 135 and machine-learning engine 140 output data to the event bus 222. At the same time, the components of the machine-learning engine 140 may also subscribe to receive different event streams from the event bus 222. For example, the micro-feature classifier 255 may subscribe to receive the micro-feature vectors output from the computer vision engine 135.

Generally, the workspace 240 provides a computational engine for the machine-learning engine 140. For example, the workspace 240 may be configured to copy information from the perceptual memory 230, retrieve relevant memories from the episodic memory 235 and the long-term memory 225, select which codelets 245 to execute. Each codelet 245 may be a software program configured to evaluate different sequences of events and to determine how one sequence may follow (or otherwise relate to) another (e.g., a finite state machine). More generally, each codelet may provide a software module configured to detect interesting patterns from the streams of data fed to the machine-learning engine. In turn, the codelet 245 may create, retrieve, reinforce, or modify memories in the episodic memory 235 and the long-term memory 225. By repeatedly scheduling codelets 245 for execution, copying memories and percepts to/from the workspace 240, the machine-learning engine 140 performs a cognitive cycle used to observe, and learn, about patterns of behavior that occur within the scene.

In one embodiment, the perceptual memory 230, the episodic memory 235, and the long-term memory 225 are used to identify patterns of behavior, evaluate events that transpire in the scene, and encode and store observations. Generally, the perceptual memory 230 receives the output of the computer vision engine 135 (e.g., the context event stream). The episodic memory 235 stores data representing observed events with details related to a particular episode, e.g., information describing time and space details related to an event. That is, the episodic memory 235 may encode specific details of a particular event, i.e., "what and where" something occurred within a scene, such as a particular vehicle (car A) moved to a location believed to be a parking space (parking space 5) at 9:43 AM.

In contrast, the long-term memory 225 may store data generalizing events observed in the scene. To continue with the example of a vehicle parking, the long-term memory 225 may encode information capturing observations and generalizations learned by an analysis of the behavior of objects in the scene such as "vehicles in certain areas of the scene tend to be in motion," "vehicles tend to stop in certain areas of the scene," etc. Thus, the long-term memory 225 stores observations about what happens within a scene with much of the particular episodic details stripped away. In this way, when a new event occurs, memories from the episodic memory 235 and the long-term memory 225 may be used to relate and understand a current event, i.e., the new event may be compared with past experience, leading to both reinforcement, decay, and adjustments to the information stored in the long-term memory 225, over time. In a particular embodiment, the long-term memory 225 may be implemented as an ART network and a sparse-distributed memory data structure.

The micro-feature classifier 255 may schedule a codelet 245 to evaluate the micro-feature vectors output by the computer vision engine 135. As noted, the computer vision engine 135 may track objects frame-to-frame and generate micro-feature vectors for each foreground object at a rate of, e.g., 5 Hz. In one embodiment, the micro-feature classifier 255 may be configured to create clusters from this stream of micro-feature vectors. For example, each micro-feature vector may be supplied to an input layer of the ART network (or a combination of a self organizing map (SOM) and ART network used to cluster nodes in the SOM). In response, the ART network maps the micro-feature vector to a cluster in the ART network and updates that cluster (or creates a new cluster if the input micro-feature vector is sufficiently dissimilar to the existing clusters). Each cluster is presumed to represent a distinct object type, and objects sharing similar micro-feature vectors (as determined using the choice and vigilance parameters of the ART network) may map to the same cluster.

For example, the micro-features associated with observations of many different vehicles may be similar enough to map to the same cluster (or group of clusters). At the same time, observations of many different people may map to a different cluster (or group of clusters) than the vehicles cluster. Thus, each distinct cluster in the art network generally represents a distinct type of object acting within the scene. And as new objects enter the scene, new object types may emerge in the ART network.

Importantly, however, this approach does not require the different object type classifications to be defined in advance; instead, object types emerge over time as distinct clusters in the ART network. In one embodiment, the micro-feature classifier 255 may assign an object type identifier to each cluster, providing a different object type for each cluster in the ART network.

In an alternative embodiment, rather than generate clusters from the micro-features vector directly, the micro-feature classifier 255 may supply the micro-feature vectors to a self-organizing map structure (SOM). In such a case, the ART network may cluster nodes of the SOM—and assign an object type identifier to each cluster. In such a case, each SOM node mapping to the same cluster is presumed to represent an instance of a common type of object.

As shown, the machine-learning engine 140 also includes a cluster layer 260 and a sequence layer 265. The cluster layer 260 may be configured to generate clusters from the trajectories of objects classified by the micro-feature classifier 255 as being an instance of a common object type. In one embodiment, the cluster layer 260 uses a combination of a self-organizing map (SOM) and an ART network to cluster the kinematic data in the trajectories. Once the trajectories are clustered, the sequence layer 265 may be configured to generate sequences encoding the observed patterns of behavior represented by the trajectories. And once generated, the sequence layer may identify segments within a sequence using a voting experts technique. Further, the sequence layer 265 may be configured to identify anomalous segments and sequences.

In context of detecting sea-surface oil, the machine learning engine 140 may observe foreground blobs (presumably patches of sea-surface oil) and, over time, identify where patches tend to appear, how frequently patches appear, how long a patch remains, how large patches tend to be, etc. And after observing a sea-surface area for a period of time, the machine learning engine 140 may distinguish between (1) patches of surface oil that occur incident to the normal operations of an offshore drilling platform and other spurious oil patches, and (2) patches of surface oil that need to be investigated or evaluated by platform personnel. That is, given the complexity of a maritime environment, the complexity of reflections and spurious light and oil observations in the proximity of boats, ships and offshore platforms, the machine learning engine 140 is used to learn to identify what are "normal" observations of sea-surface oil and what are "abnormal" or "unusual" observations that require investigation.

Detecting Anomalous Sea-Surface Oil in a Machine-Learning Video Analytics System As noted above, a machine-learning video analytics system may be configured to use a computer vision engine to observe a scene, generate information streams of observed activity, and to pass the streams to a machine learning engine. In turn, the machine learning engine may engage in an undirected and unsupervised learning approach to learn patterns regarding the object behaviors in that scene. Thereafter, when unexpected (i.e., abnormal or unusual) behavior is observed, alerts may be generated.

In one embodiment, a multiplexor module is configured to receive video streams (also referred to herein as "signals") from three or more long-wavelength infrared (LWIR) cameras whose output is filtered by distinct band-pass filters and multiplex the signals to generate a single synthetic signal whose brightness indicates a match with an IR signature of sea-surface oil. A computer vision engine determines, from the synthetic signal, foreground blobs representing patches of contiguous pixels having values indicating a match to the IR signature of oil, and further extracts features such as position, size, change in size, etc. which are pertinent to sea-surface oil. In turn, a machine learning engine is configured to build models of behaviors within the scene based on the foreground blobs and extracted features, and determine whether observations indicate that the behavior of an object is anomalous or not, relative to the model. In one embodiment, e.g., the machine learning engine may model observed sea-surface oil over time (including spurious oil), and determine whether any given foreground blob corresponding to sea-surface oil is unusual or anomalous relative to prior sea-surface oil which has been observed. The machine learning engine may issue an alert when anomalous sea-surface oil is observed so that the oil may be investigated.

Figure 3:
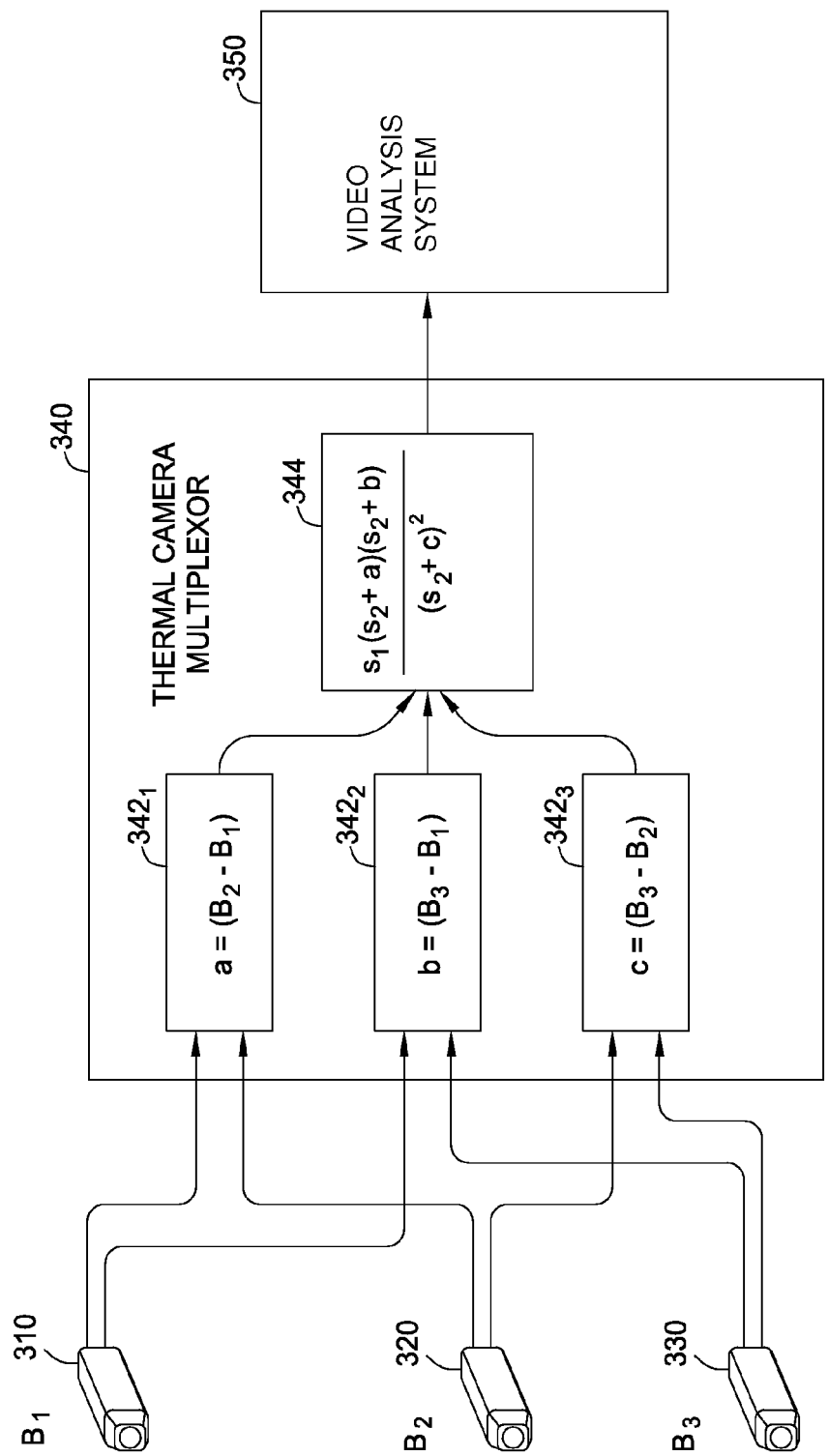
FIG. 3 illustrates a system for generating a synthetic video stream for detecting sea-surface oil and deriving expected patterns in the synthetic video stream, according to one embodiment of the invention.

FIG. 3 illustrates a system for generating a synthetic video stream for detecting sea-surface oil and deriving expected patterns in the synthetic video stream, according to one embodiment. As shown, the system includes LWIR cameras 310-330 which capture the "thermal" part of the light spectrum. Captured light from each of the cameras 310-300 is filtered using a respective spectral band-pass filter to generate filtered signals in a distinct wavelength band.

According to physics theory, objects made of normal matter (e.g., electrons, protons, and neutrons) and having finite non-zero temperatures continuously emit electromagnetic radiation. Depending on the temperature of a given object, the emitted radiation may mostly be X-rays, ultraviolet light, visible light, infrared light, microwaves, or radio waves. An idealized object called a blackbody that is perfectly efficient at this process would emit radiation energy as a function of the wavelength of the light according to Planck's law:

$$B_\lambda(T) = \frac{2hc^2/\lambda^5}{(e^{hc/\lambda kT} - 1)}, \quad (1)$$

where, h is Planck's constant, c is the speed of light, k is Boltzmann's constant, $\lambda$ is the wavelength of emitted radiation, and T is the temperature (° K) of the emitting object. Real physical objects are not perfectly efficient radiators of electromagnetic radiation, and emit a different distribution of energy than Plank's law given by:

$$B_\lambda(T, \theta) = \frac{2hc^2/\lambda^5}{(e^{hc/\lambda kT} - 1)} \epsilon_\lambda(T, \theta), \quad (2)$$

where $\epsilon_\lambda$ is the spectral emissivity and will generally be a complicated function of wavelength, angle, and temperature, as an object can radiate more efficiently in some directions and/or colors of light than others and this dependence may vary with temperature. A related quantity, the spectral reflectivity $\rho_\lambda$, that describes what fraction of energy incident upon an object is reflected back, may likewise be a function of temperature, angle, and wavelength.

Figure 4:
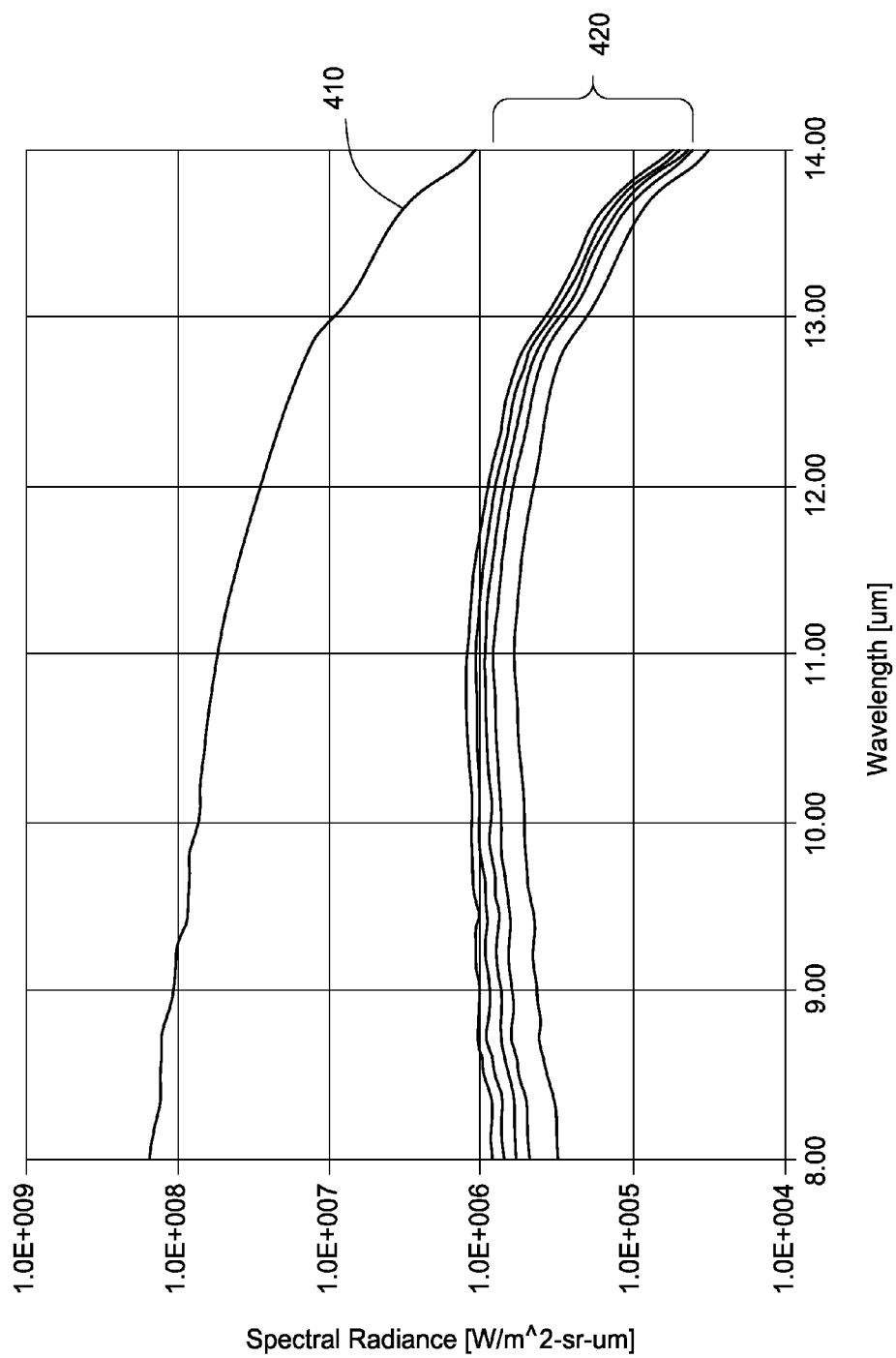
FIG. 4 illustrates spectral radiance contrast between sea-water and modeled surface oil.

The spectral emissivity and spectral reflectivity of oil and water at different temperatures are well-known. The contrast (i.e., the difference) between modeled spectral radiances (here, the combination of emission and reflected radiances) of seawater and oil is shown in FIG. 4, which depicts the contrasts |radiance$_{oil}$–radiance$_{sea}$| at various temperatures from 275-325° K during the daytime 410 and during the nighttime 420. Note, the observed ocean will typically be acting as an emissive source of radiation with a temperature somewhere between 275° K and 325° K at nighttime, and during the daytime, there will be additional components to the radiation field corresponding to the reflected sunlight as well. In one embodiment, the contrast, at a given temperature, between the emitted radiance curves of seawater versus oil and/or reflected radiance of seawater versus oil, or a combination of the two, may be used to distinguish between water and oil. For example, oil and seawater may be distinguished using an approach which is sensitive to the shape of the curves in FIG. 4.

Returning to FIG. 3, a thermal camera multiplexor module 340 may be configured to multiplex the input from cameras 310-330 equipped with band-pass filters, producing signals $B_1$, $B_2$, and $B_3$. Each of signals $B_1$, $B_2$, and $B_3$ may produce a single data-point per image-pixel corresponding to a gray-scale brightness of the scene in that particular spectral band. In one embodiment, signal $B_1$ may be generated using a 8.0-9.0 µm band-pass filter, signal $B_2$ may be generated using a 8.0-11.5 µm band-pass filter, and signal $B_3$ may be generated using an 8.0-13.0 µm band-pass filter. In alternative embodiments, other band-pass filters may be used, including more (or fewer) than three band-pass filters and band-pass filters for different wavelength ranges. In yet another embodiment, vertical polarizing filters may also be used to minimize specular reflection effects.

The multiplexor module 340 may then compute the difference between the inputs a=$B_2$–$B_1$, b=$B_3$–$B_1$, c=$B_3$–$B_2$ at $342_{1-3}$ and examine the relative sizes of the contrast values. In one embodiment, given the differences between the inputs a, b, and c, the multiplexor module 340 may generate a synthetic discriminant video stream by taking the ratio $$\frac{s_1(s_1 + a)(s_2 + b)}{(s_2 + c)^2},$$

where $s_1$ and $s_2$ are constants which normalize the ratio to, e.g., the range [0, 1], with 0 being water and 1 being oil. Here, the synthetic video stream is directly proportional to the differences a and b which correspond to contrasts between wavelength ranges in which difference between radiance from seawater is substantially greater than difference between radiance from oil, and inversely proportional to the difference c which corresponds to a contrast between wavelength ranges in which difference between radiance from oil is substantially greater than difference between radiance from seawater. As a result, the synthetic video stream is a synthetic video stream which tends to maximize the contrast between the spectral signatures of water and oil. That is, the synthetic video stream may be a black-and-white video stream in which the brightness of respective image pixels correspond to how closely the IR signature of the pixel matches what would be expected from oil.

As shown, the synthetic discriminant video stream output by the multiplexor module 340 is subsequently input to video analysis system 350, which is similar to the video analysis system described in conjunction with FIGS. 1-2. The video analysis system 350 may include a computer vision engine which determines, from the synthetic video stream, foreground blobs representing patches of contiguous pixels having values indicating a match to the IR signature of oil using, e.g., per-pixel ART networks, as previously discussed. The computer vision engine may also extract features such as locations and sizes of foreground blobs, rates of change in blob size and/or a measure of intensity (i.e., how bright the blob is), motion characteristics of the foreground blobs, whether the foreground blobs have non-sharp edges, whether the foreground blobs have high fractal dimension, and whether the foreground blobs are asymmetrical, etc. which are pertinent to sea-surface oil. The video analysis system 350 may further include a machine learning engine which receives the foreground blobs and features extracted by the computer vision engine, and which engages in undirected and unsupervised learning to discern patterns of object behaviors in the scene of the synthetic discriminant video stream, discussed in greater detail below. Thereafter, when unexpected (i.e., abnormal or unusual) sea-surface oil is observed, the machine learning engine may generate an alert so that the sea-surface oil may be investigated.

Figure 5:
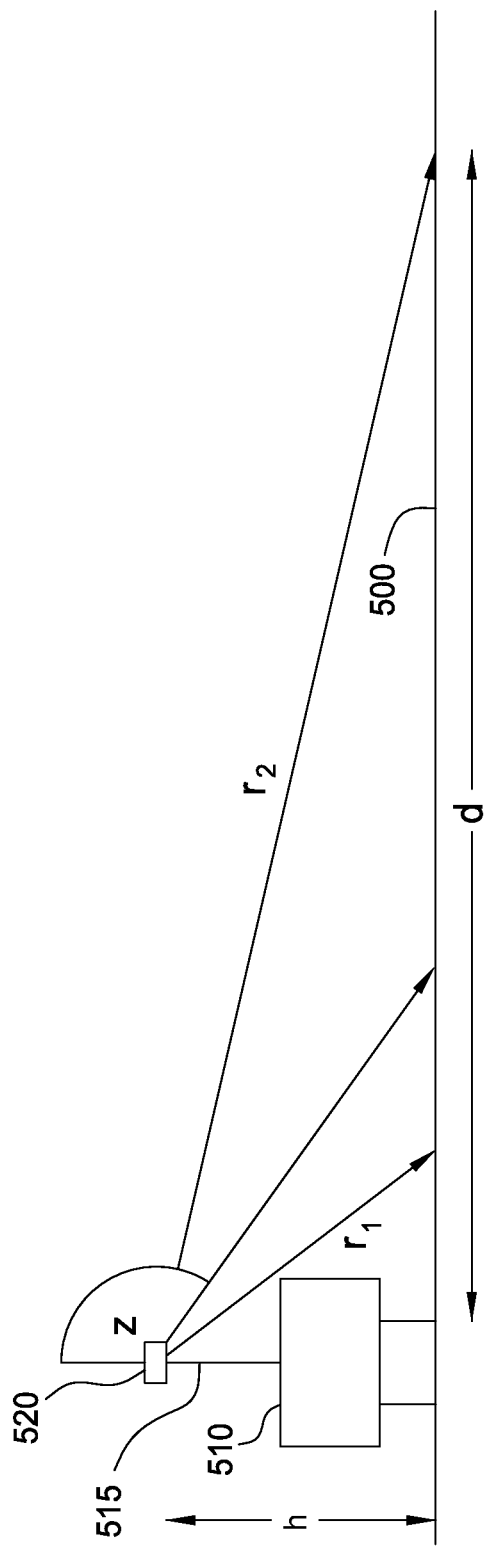
FIG. 5 illustrates an exemplary geometry for mounting video cameras on an offshore oil platform, according to one embodiment of the invention.

FIG. 5 illustrates an exemplary geometry for mounting video cameras on an offshore oil platform 510, according to one embodiment. As shown, the oil platform 510 includes a mast 515 on which one or more sets of LWIR cameras 520 are mounted, at a height h above a sea surface 500, to observe the sea surface 500. Each set of LWIR cameras may include three or more cameras, with the signal of each camera in the set filtered by a band-pass filter for a distinct wavelength range and the filtered signal being multiplexed to generate a synthetic discriminant video stream that is input to a video analysis system. In one embodiment, several sets of fixed cameras, each oriented toward a different azimuth, may be used to achieve full 360° azimuthal coverage of the sea surface. In an alternative embodiment, a single set of cameras may be configured to perform a continuing guard-tour sweep to achieve full azimuthal coverage.

Illustratively, the cameras 520 are able to view a segment of the sea surface beginning from near the platform 510 at $r_1$ and extending out to a distance $r_2$, which may be, e.g., several kilometers away from the platform 510. In one embodiment, wide-angle camera lenses may be used to view a relatively large portion of the sea surface. Generally, the higher the cameras 520 are placed (i.e., the greater h is), the further away the apparent horizon will be, and the further the cameras 520 will be able to see. However, due to effects from, e.g., sea-surface spray and aerosols, discrimination of oil from seawater may not be possible out to the horizon itself. The particular maximum distance and limiting ranges may depend on the cameras 520 used, the arrangement of the oil platform 510, among other things.

Figure 6:
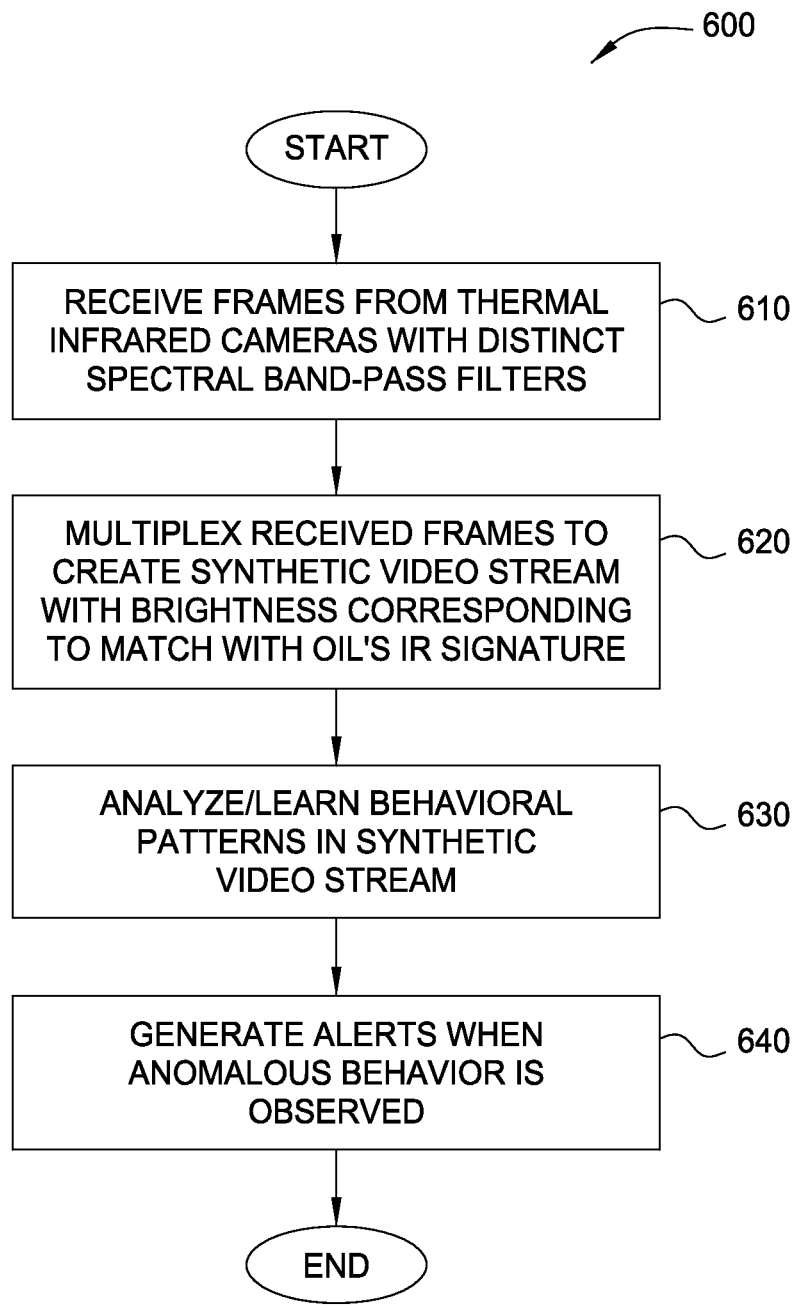
FIG. 6 illustrates a method for detecting and reporting on anomalous sea-surface oil, according to one embodiment of the invention.

FIG. 6 illustrates a method 600 for detecting and reporting on anomalous sea-surface oil, according to one embodiment. As shown, the method 600 begins at step 610, where a camera multiplexor module receives video frames from LWIR cameras with distinct spectral band-pass filters. In one embodiment, three or more cameras may be used for purposes of detecting surface oil, and the band-pass filters may be chosen so as to let through light in wavelength ranges in which the radiance contrast between seawater and surface oil is relatively large. Doing so may permit the spectral radiance signatures of seawater and surface oil to be more clearly distinguishable from each other. In a particular embodiment, video frames $B_1$, $B_2$, and $B_3$ may be received, with the $B_1$ signal being filtered by a 8.0-9.0 μm band-pass filter, the $B_2$ signal being filtered by a 8.0-11.5 μm band-pass filter, and the $B_3$ signal being filtered by a 8.0-13.0 μm band-pass filter. Note, the specific bands here are representative values given for illustrative purposes, and the actual bands used may be different in other embodiments.

At step 620, the multiplexor module combines the received frames to create a synthetic discriminant video stream with brightness corresponding to a match with the IR signature of oil. In one embodiment, the multiplexor module may compute differences between pairs of received video frames in different wavelength ranges. In such a case, the synthetic video stream may be directly proportional to the difference(s) which correspond to contrasts between wavelength ranges in which difference between radiance from seawater is substantially greater than difference between radiance from oil, and inversely proportional to difference(s) which correspond to contrast between wavelength ranges in which difference between radiance from oil is substantially greater than difference between radiance from seawater, or vice versa. Returning to the example of received signals $B_1$, $B_2$, and $B_3$ discussed above, the multiplexor module may compute the difference between the inputs $a=B_2-B_1$, $b=B_3-B_1$, $c=B_3-B_2$, and generate the discriminant video stream by taking the ratio $$\frac{s_1(s_1+a)(s_2+b)}{(s_2+c)^2},$$

where $s_1$ and $s_2$ are constants which normalize the ratio to, e.g., the range [0, 1], with 0 being water and 1 being oil. In alternative embodiments, the particular form of the equation for multiplexing the received frames to generate a discriminant signal may be different.

At step 630, a video analysis system analyzes and learns behavioral patterns in the synthetic video stream. As discussed, a computer vision engine of the video analysis system may separate foreground blobs depicting oil from background depicting seawater given the synthetic discriminant video stream with brightness corresponding to a match with the IR signature of oil. For example, the computer vision engine may model the scene background and select pixels as foreground using per-pixel ART networks, discussed above. Contiguous regions of pixels classified as foreground may eventually be passed to the machine learning engine.

As discussed, the computer vision engine may also include an estimator/identifier component which identifies kinematic and/or appearance features of foreground objects such as size, height, width, and area (in pixels), reflectivity, shininess rigidity, speed velocity, etc. In one embodiment, features used to determine sea-surface oil may include the locations and sizes of foreground blobs, rates of change in blob size and/or a measure of intensity (i.e., how bright the blob is), motion characteristics of the foreground blobs, whether the foreground blobs have non-sharp edges, whether the foreground blobs have high fractal dimension, and whether the foreground blobs are asymmetrical. Such features may be particularly relevant to sea-surface oil, as surface oil blobs may tend to be, e.g., irregular in shape and thus have high fractal dimension, asymmetrical, lack sharp edges, move in certain ways, appear in certain places and have certain sizes, etc.

The foreground blobs and extracted features are provided to a machine learning engine of the video analysis system, which may observe foreground blobs and, over time, identify where patches tend to appear, how frequently patches appear, how long patches remain (or remains depending on where it appeared), how large patches tend to be, and characteristics and/or patterns of other features as they tend to appear in the scene. With the observations of the sea-surface area for a period of time, the machine learning engine may build a model of expected behavior in the scene. Doing so permits commonly-occurring and spurious sea-surface oil patches, which may be caused by, e.g., normal operation of the oil platform, lighting artifacts or changes in the maritime environment, etc. to be learned so that alerts are not generated when such commonly-occurring false-positive patches are observed. For example, using shape, location, or other appearance features, the machine learning engine may automatically learn to classify foreground blobs by shape, location, and appearance. If an observed object in a later video frame has oil-like characteristics, and is thus extracted by the computer vision engine as a foreground blob, the machine learning engine may determine, based on the shape, location, or other appearance features of this new foreground blob, whether the blob is shaped, located, appears, etc. like objects which were previously observed.

In one embodiment, the machine learning engine may include a long-term memory storing data generalizing events observed in the scene, where the long term memory is implemented as ART network(s) and sparse-distributed memory data structure(s), discussed above. In such a case, feature vectors may be supplied to an input layer of the ART network (or a combination of a self organizing map (SOM) and ART network used to cluster nodes in the SOM), and the ART network may map the micro-feature vector to a cluster in the ART network and update that cluster (or create a new cluster if the input micro-feature vector is sufficiently dissimilar to the existing clusters). Over time, predictable "oil" patches, whether resulting from oil generated incident to normal operation of the platform or spurious patches resulting from lighting artifacts or changes in the maritime environment, may produce relatively dense ART network clusters. Then, when another "oil" patch having a similar feature vector is received, the machine learning engine may map this "oil" patch to one of the dense clusters and, given such a mapping, identify the patch as "normal." That is, the system may learn to ignore commonly-occurring and spurious sea-surface oil patches caused by, e.g., normal operation of the oil platform, lighting artifacts or changes in the maritime environment, etc., which may produce relatively dense ART network clusters.

Additional and further approaches for extracting objects and features from video frames and learning and reporting on behaviors in a scene are discussed in, e.g., U.S. Pat. No. 8,126,833, entitled "Detecting Anomalous Events Using a Long-Term Memory in a Video Analysis System"; U.S. Pat. No. 8,131,012, entitled "Behavioral Recognition System"; U.S. Pat. No. 8,167,430, entitled "Unsupervised Learning of Temporal Anomalies for a Video Surveillance System"; U.S. Pat. No. 8,180,105, entitled "Classifier Anomalies for Observed Behaviors in a Video Surveillance System"; U.S. Pat. No. 8,189,905, entitled "Cognitive Model for a Machine-Learning Engine in a Video Analysis System"; U.S. Pat. No. 8,218,818, entitled "Foreground Object Tracking"; U.S. Pat. No. 8,270,733, entitled "Identifying Anomalous Object Types During Classification"; U.S. Pat. No. 8,285,060, entitled "Detecting Anomalous Trajectories in a Video Surveillance System"; U.S. Pat. No. 8,300,924, entitled "Tracker Component for Behavioral Recognition System"; U.S. Pat. No. 8,358,834, entitled "Background Model for Complex and Dynamic Scenes"; U.S. Pat. No. 8,411,935, entitled "Semantic Representation Module of a Machine-Learning Engine in a Video Analysis System"; U.S. Pat. No. 8,416,296, entitled "Mapper Component for Multiple Art Networks in a Video Analysis System"; and U.S. Pat. No. 8,494,222, entitled "Classifier Anomalies for Observed Behaviors in a Video Surveillance System," which are hereby incorporated by reference in their entirety.

At step 640, video analysis system generates alerts when anomalous behavior is observed. As discussed, the machine learning engine may, over time, learn to distinguish between observed patches of sea-surface oil that occur normally and patches of surface oil that do not, and are thus anomalous. When such an anomalous surface oil patch is observed, the video analysis system may issue to an alert to, e.g., a user interface, so that the anomalous surface oil patch may be investigated.

Although discussed above with respect to distinguishing oil from seawater, techniques disclosed herein may be used to distinguish other objects having different spectral radiance signatures from one another. In such cases, the radiation need not be infrared light, and may instead be X-rays, ultraviolet light, visible light, microwaves, or radio waves, and appropriate cameras and/or filters may be used to capture the radiation. Further, although discussed above with respect to cameras, other devices, such as spectrometers, may be used in lieu of cameras.

Advantageously, techniques disclosed herein permit surface oil to be distinguished from seawater using input from multiple LWIR cameras whose signals are band-pass filtered and multiplexed to generate a single synthetic discriminant signal. Patterns of behavior in the scene are then learned so that anomalous sea-surface oil patches, which may result from oil spills or leaks, may be reported while other surface oil patches from normal operation of the oil platform or spurious patches from changing maritime conditions, etc. are not reported.

While the foregoing is directed to embodiments of the present invention, other and further embodiments of the invention may be devised without departing from the basic scope thereof, and the scope thereof is determined by the claims that follow.

What is claimed is:

1. A computer-implemented method for analyzing a scene depicted in an input stream of video frames, the method comprising:
   for one or more of the video frames:
   identifying one or more foreground blobs in the video frames,
   wherein each foreground blob corresponds to one or more contiguous pixels of the video frame determined to depict sea-surface oil; and
   evaluating the one or more foreground blobs to derive expected patterns of observations of sea-surface oil.

2. The method of claim 1, wherein the input stream of video frames is generated by combining filtered video frames generated by three or more long-wavelength infrared (LWIR) cameras whose signals are filtered by band-pass filters allowing light in respective wavelength ranges to pass.

3. The method of claim 2, wherein the wavelength ranges are substantially 8-9 micrometers, 8-11.5 micrometers, and 8-13 micrometers.

4. The method of claim 2, wherein the signals of the LWIR cameras are further filtered by one or more polarizing filters.

5. The method of claim 2, wherein the LWIR cameras are mounted to observe an area surrounding an offshore oil platform.

6. The method of claim 2, wherein combining the video frames includes determining differences between pairs of the filtered video frames generated by respective LWIR cameras, and wherein the input stream of video frames is directly proportional to the differences which correspond to contrasts between wavelength ranges in which difference between radiance from seawater is substantially greater than difference between radiance from oil, and inversely proportional to differences which correspond to contrast between wavelength ranges in which difference between radiance from oil is substantially greater than difference between radiance from seawater, or vice versa.

7. The method of claim 1, further comprising:
   receiving a set of foreground blobs identified in a subsequent one of the video frames; and
   upon determining that at least a first one of the foreground blobs does not correspond to at least one of the expected patterns of occurrences of sea-surface oil, generating an alert message.

8. The method of claim 1, wherein the foreground blobs are evaluated based on one or more features associated with the foreground blobs, wherein the features include at least one of locations of the blobs, sizes of the blobs, rates of change in blob sizes, a measure of intensity of the blobs, motion characteristics of the blobs, whether the blobs have non-sharp edges, whether the blobs have high fractal dimension, and whether the blobs are asymmetrical.

9. The method of claim 1, wherein the expected patterns of observations of sea-surface oil are learned using an adaptive resonance theory (ART) network or a combination of an ART network and a self-organizing map (SOM).

10. A non-transitory computer-readable storage medium storing instructions, which when executed by a computer system, perform operations for analyzing a scene depicted in an input stream of video frames, the operations comprising:
for one or more of the video frames:
identifying one or more foreground blobs in the video frames,
wherein each foreground blob corresponds to one or more contiguous pixels of the video frame determined to depict sea-surface oil; and
evaluating the one or more foreground blobs to derive expected patterns of observations of sea-surface oil.

11. The computer-readable storage medium of claim 10, wherein the input stream of video frames is generated by combining filtered video frames generated by three or more long-wavelength infrared (LWIR) cameras whose signals are filtered by band-pass filters allowing light in respective wavelength ranges to pass.

12. The computer-readable storage medium of claim 11, wherein the wavelength ranges are substantially 8-9 micrometers, 8-11.5 micrometers, and 8-13 micrometers.

13. The computer-readable storage medium of claim 11, wherein the signals of the LWIR cameras are further filtered by one or more polarizing filters.

14. The computer-readable storage medium of claim 11, wherein the LWIR cameras are mounted to observe an area surrounding an offshore oil platform.

15. The computer-readable storage medium of claim 11, wherein combining the video frames includes determining differences between pairs of the filtered video frames generated by respective LWIR cameras, and wherein the input stream of video frames is directly proportional to the differences which correspond to contrasts between wavelength ranges in which difference between radiance from seawater is substantially greater than difference between radiance from oil, and inversely proportional to differences which correspond to contrast between wavelength ranges in which difference between radiance from oil is substantially greater than difference between radiance from seawater, or vice versa.

16. The computer-readable storage medium of claim 10, the operations further comprising:
after deriving the expected patterns of occurrences of sea-surface oil:
receiving a set of foreground blobs identified in a subsequent one of the video frames; and
upon determining that at least a first one of the foreground blobs does not correspond to at least one of the expected patterns of occurrences of sea-surface oil, generating an alert message.

17. The computer-readable storage medium of claim 10, wherein the foreground blobs are evaluated based on one or more features associated with the foreground blobs, wherein the features include at least one of locations of the blobs, sizes of the blobs, rates of change in blob sizes, a measure of intensity of the blobs, motion characteristics of the blobs, whether the blobs have non-sharp edges, whether the blobs have high fractal dimension, and whether the blobs are asymmetrical.

18. The computer-readable storage medium of claim 10, wherein the expected patterns of observations of sea-surface oil are learned using an adaptive resonance theory (ART) network or a combination of an ART network and a self-organizing map (SOM).

19. A system, comprising:
a processor; and
a memory, wherein the memory includes an application program configured to perform operations for analyzing a scene depicted in an input stream of video frames, the operations comprising:
for one or more of the video frames:
identifying one or more foreground blobs in the video frames,
wherein each foreground blob corresponds to one or more contiguous pixels of the video frame determined to depict sea-surface oil, and
evaluating the one or more foreground blobs to derive expected patterns of observations of sea-surface oil.

20. The system of claim 19, wherein the input stream of video frames is generated by combining filtered video frames generated by three or more long-wavelength infrared (LWIR) cameras whose signals are filtered by band-pass filters allowing light in respective wavelength ranges to pass.

21. The system of claim 20, wherein the LWIR cameras are mounted to observe an area surrounding an offshore oil platform.

22. The system of claim 20, wherein combining the video frames includes determining differences between pairs of the filtered video frames generated by respective LWIR cameras, and wherein the input stream of video frames is directly proportional to the differences which correspond to contrasts between wavelength ranges in which difference between radiance from seawater is substantially greater than difference between radiance from oil, and inversely proportional to differences which correspond to contrast between wavelength ranges in which difference between radiance from oil is substantially greater than difference between radiance from seawater, or vice versa.

23. The system of claim 19, the operations further comprising:
receiving a set of foreground blobs identified in a subsequent one of the video frames; and
upon determining that at least a first one of the foreground blobs does not correspond to at least one of the expected patterns of occurrences of sea-surface oil, generating an alert message.

24. The system of claim 19, wherein the foreground blobs are evaluated based on one or more features associated with the foreground blobs, wherein the features include at least one of locations of the blobs, sizes of the blobs, rates of change in blob sizes, a measure of intensity of the blobs, motion characteristics of the blobs, whether the blobs have non-sharp edges, whether the blobs have high fractal dimension, and whether the blobs are asymmetrical.

25. A method of analyzing a scene depicted in an input stream of video frames, comprising:
for one or more of the video frames:
identifying one or more foreground blobs in the video frame, wherein each foreground blob corresponds to contiguous pixels of the video frame determined by a behavior recognition system to depict a patch of sea-surface oil, wherein the behavior recognition system is configured to learn to distinguish between foreground objects depicting patches of sea-surface oil and false positive detections of patches of sea-surface oil resulting from noise occurring in the one or more video frames; and upon determining one of the foreground blobs depicts a patch of sea-surface oil deviates from expected patterns of sea-surface oil derived by the behavior recognition system, generating an alert message.

26. The method of claim 25, wherein the noise comprises one or more of lighting, absorption, and extinction artifacts in the one or more video frames.

27. The method of claim 25, wherein the expected patterns of observations of sea-surface oil are derived by the behavior recognition system using an adaptive resonance theory (ART) network or a combination of an ART network and a self-organizing map (SOM).

* * * * *